Figure 1:
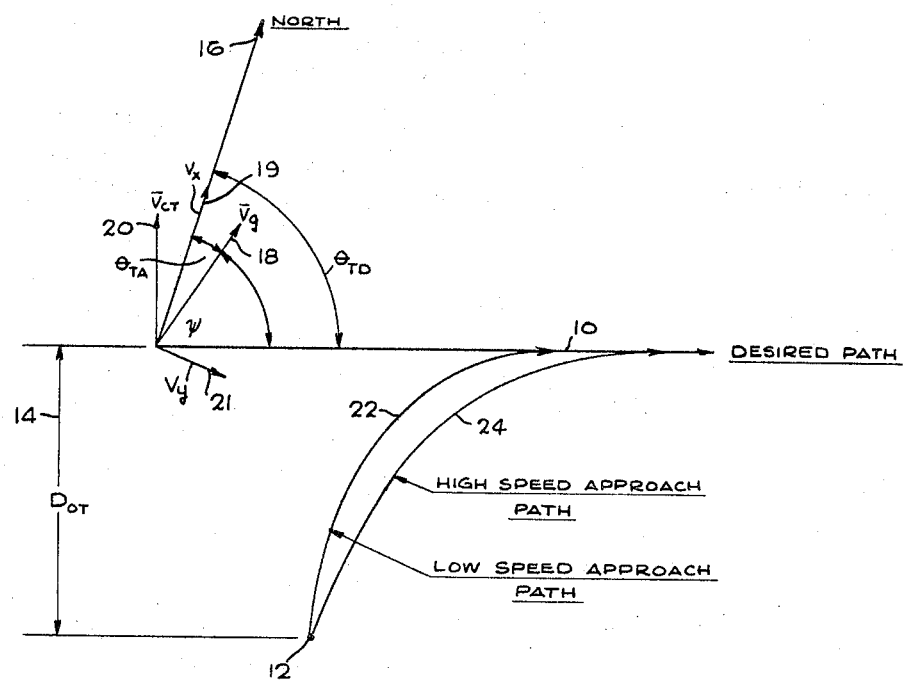

RICHARD S. THROCKMORTON
INVENTOR.

BY
Ernest L. Brown
ATTORNEY

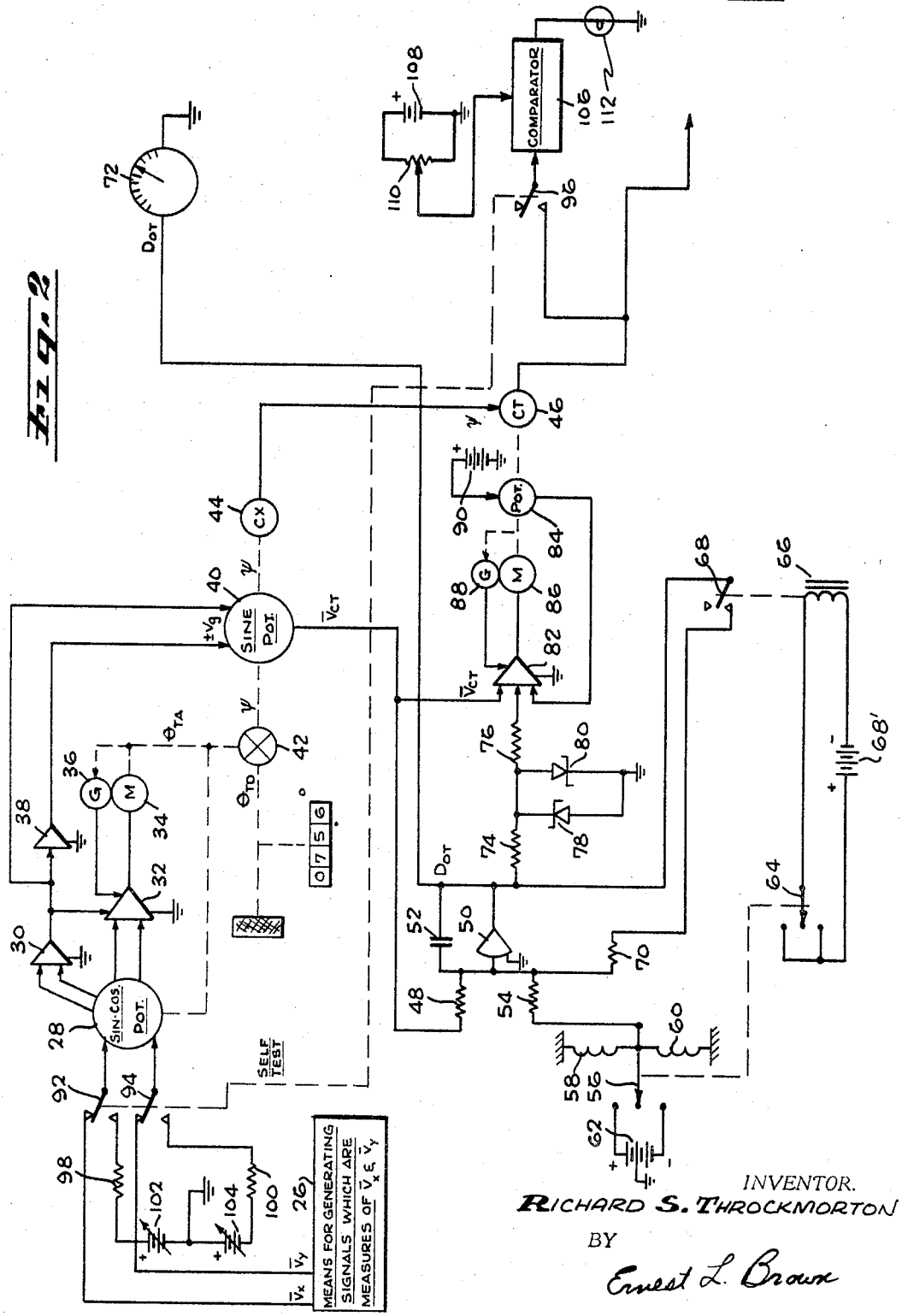

United States Patent Office
3,436,531
Patented Apr. 1, 1969

1

3,436,531
TRACK FOLLOWER FOR CONTROLLING
AIRCRAFT FLIGHT
Richard S. Throckmorton, Chatsworth, Los Angeles,
Calif., assignor to Litton Systems, Inc., Beverly
Hills, Calif.
Filed May 28, 1965, Ser. No. 459,542
Int. Cl. G06g 7/78
U.S. Cl. 235—150.26                    10 Claims This invention pertains to means for generating a signal for steering a vehicle, and more particularly to a means for generating a steering signal which is adapted to steer a vehicle such as an aircraft onto a predetermined desired path or track over the surface of the earth.

Various auto-pilot techniques have been developed to cause a vehicle such as an aircraft to follow a desired path or track over the surface of the earth. However, experience indicates that such control systems have a tendency to oscillate about the desired path. Further, if the vehicle is a substantial distance from the desired path, it is desirable to have the vehicle approach the desired path on an optimum course and to approach the desired path tangentially to reduce the tendency to oscillate.

The device contemplated by this invention generates a steering signal for a vehicle to cause it to approach a desired path or track over the surface of the earth in an optimum fashion to reduce or damp the tendency to oscillate about that desired track.

It is therefore an object of this invention to generate a steering signal for a vehicle which is adapted to cause the vehicle to approach a desired track over the surface of the earth in an optimum fashion.

It is also an object of this invention to generate steering signals, for a vehicle such as an aircraft, to cause the steady control of said aircraft along a desired path or track over the surface of the earth.

It is also an object of this invention continuously to compute and monitor the distance of a vehicle from a predetermined path or track over the surface of the earth.

It is likewise an object of this invention to cause a vehicle such as an aircraft to approach a desired path or track over the surface of the earth in paths varying with the velocity of the vehicle, the azimuth of the vehicle, and the distance of the vehicle from a desired path or track.

It is a specific object of this invention to provide apparatus which is adapted to achieve the above enumerated objects.

Other objects will become apparent from the following description, taken in connection with the accompanying drawings in which:

FIGURE 1 is a diagram of the geometry of the problem solved by the mechanism of this invention; and FIGURE 2 is a diagram, partially schematic and partially blocked, of a typical device mechanized in accordance with this invention.

Referring to FIGURE 1, the position of the desired path or track is shown at 10. The instantaneous position of the vehicle is shown at 12. The distance of the vehicle from the desired path or track is shown at 14. The direction of North (which is merely typical for illustrative purposes) is shown by the arrow 16. The direction of the velocity of the supporting vehicle (at position 12) is shown by the arrow 18. The component of the velocity of the supporting vehicle perpendicular to the desired path

2

10 is shown by the arrow 20. The north and east components of velocity are shown at 19 and 21. The azimuth or heading of the supporting vehicle is the angle between the North arrow 16 and the velocity arrow 18 and is designated $\theta_{TA}$. The azimuth of the desired path or track 10 is the angle between the North arrow 16 and the desired path 10 and is designated by $\theta_{TD}$. The azimuth or heading of the supporting vehicle relative to the azimuth of the desired path or track 10 is shown by the angle between the arrows 18 and the desired path 10, as is designated by the symbol $\Psi$ (actually a negative angle in the figure). In accordance with this invention, the supporting aircraft approaches the desired path tangentially along different paths which depend upon, among other parameters, the velocity of the supporting vehicle. Typical paths showing the difference in the path trajectory as a function of vehicle velocity are shown at 22 and 24.

Referring to the diagram of FIGURE 2, a means for generating signals which are measures of the northern component of velocity of the supporting vehicle, $V_x$, and of the eastern component of velocity of the supporting vehicle, $V_y$, is designated by the block 26. A gyroscopically stabilized platform which carries two accelerometers which are mounted in a horizontal plane and oriented to measure North and East acceleration may be used with a pair of integrators to obtain the North and East velocity signals. Alternatively, velocity meters may be used in place of the accelerometers. Still other techniques, such as radio navigation systems, may be used.

The North and East velocity signals are applied to the input terminals of a sine-cosine potentiometer 28. The potentiometer 28 North-velocity-times-the-cosine output signal and the East-velocity-times-the-sine output signal are connected to the input of a summing amplifier 30 which generates a signal which is equal to the sum of its input signals. The North-velocity-times-the-sine ouput signal and the East-velocity-times-the-cosine output signal are connected to the input of a potentiometer 28 are connected to the input of a second summing amplifier 32 which is adapted to subtract one of the two signals from the other. The output of the summing amplifier 30 is connected to the summing amplifier 32 to control the gain of amplifier 32. Amplifier 32 is connected to drive a servo motor 34 whose shaft is connected to drive a shaft velocity generator 36 whose output signal is connected to the input of summing amplifier 32. The shaft of motor 34 also is connected to drive the shaft of potentiometer 28 to cause the signal at the output of amplifier 30 to be a measure of the amplitude of the velocity of the supporting vehicle over the surface of the earth and to cause the shaft position of motor 34 to be a measure of the azimuth angle of the velocity of the supporting vehicle relative to North.

An inverting amplifier 38 inverts the signal at the output of amplifier 30. Both plus and minus velocity signals from the outputs of amplifiers 30 and 38 are connected to the input of a sine potentiometer 40.

The shaft of motor 34 is connected to an input shaft of a mechanical differential 42. A second input shaft of mechanical differential 42 is adapted to be adjusted to a predetermined position which is a measure of the azimuth angle of a desired track of the supporting vehicle over the surface of the earth to cause the position of the output shaft of differential 42 to be a measure of the azimuth angle of the velocity of the supporting vehicle relative to the direction of the desired track over the surface of the earth.

The output shaft of differential 42 is connected to drive sine potentiometer 40 and a control transmitter 44.

The control transmitter 44 is excited by a voltage source (not shown) and its output is connected to the electrical input of a control transformer 46.

The electrical output of potentiometer 40 is a measure of the cross-track velocity, $V_{CT}$, or component of velocity of the supporting vehicle perpendicular to the predetermined direction of a desired path or track over the surface of the earth.

The cross-track velocity signal from potentiometer 40 is connected to the input of an integrator comprising a series resistor 48, an operational amplifier 50, and a feed-back capacitor 52. A means for zero setting or adjusting the output of the integrator is a second input resistor 54, and a switch 56 which is typically biased into its center position by a pair of springs 58 and 60 and which is adapted to be connected to a plus or minus voltage by action, for example, of the pilot. The voltage is supplied by a voltage source 62.

To increase the speed of integration during the zero setting or adjusting operation, a second switch 64 may be connected to the switch 56 to control a relay 66 by means of a voltage source 68. The relay 66 closes a switch 68 which connects a feed-back resistor 70 in parallel with capacitor 52.

The output of the integrator is connected to a measuring instrument which typically may be a chart or a dial 72.

The output of the integrator is also connected through a limiting circuit comprising a T network having two resistors 74 and 76 in its series, branch and a pair of parallel oppositely poled Zener diodes 78 and 80 in its shunt branch.

A summing amplifier 82 is connected to the output potentiometer 40, the output of the limiting circuit at resistor 76, and to the output of a potentiometer 84 which is driven by a motor 86 which in turn, is driven by the output of amplifier 82. The shaft of motor 86 is also connected to a shaft velocity generator 88 whose output is connected to the input of amplifier 82. Potentiometer 84 is energized, by a voltage source 90.

The shaft of motor 86 drives control transformer 46 to generate a signal at the output terminal of control transformer 46 which is the desired steering signal in accordance with this invention.

A self-test feature is also provided in this circuit. Three switches 92, 94 and 96 are thrown to their second position to initiate the self-test. In those positions the inputs of potentiometer 28 are connected through resistors 98 and 100 to a pair of voltage sources 102 and 104. Although voltage sources 102 and 104 are shown with a particular polarity, the polarity may be reversed at the option of the operator. Voltage sources 102 and 104 are shown as adjustable and may be adjusted to not only a predetermined polarity but also a predetermined amplitude.

The closing of switch 96 connects the output of control transformer 46 to the input of a comparator or comparison circuit 106. A a voltage source 108 and potentiometer 110 are shown by way of example as a means for generating a predetermined voltage against which the output of control transformer 46 may be compared. The output of comparator 106 is shown connected to a lamp 112 but, alternatively, could be connected to any other kind of desired signal device or meter showing whether the output of control transformer 46 differs from the voltage on the arm of potentiometer 110.

In operation, the pilot sets a shaft position $\theta_{TD}$ into one of the input shafts of differential 42 which represents the azimuth of the desired track or path of the supporting vehicle over the surface of the earth. At a particular check point whose distance from the desired track 10 is known, the pilot operates switches 56 and 64 together to set the known distance on meter 72 then releases the switch 56 which is centered by springs 58 and 60. Thereafter, meter 72 continues to keep track of the distance of the supporting vehicle from the desired path or track and the output of control transformer 46 generates a steering signal which causes the vehicle to intercept the desired path 10 on an optimum path 22 or 24.

The signals $V_x$ and $V_y$, supplied to the input of sine-cosine potentiometer 28 cause the motor 34 to drive its shaft to a position which is proportional to the angle $\theta_{TA}$ which is the direction or azimuth of the heading of the supporting vehicle at some position. Signals which are measures of velocity of the supporting vehicle are also applied to the input of sine potentiometer 40. The output shaft of differential 42 driving sine potentiometer 40 causes the output signal of sine potentiometer 40 to be a measure of the cross-track distance $V_{CT}$. The output shaft angle of differential 42 is a measure $\Psi$ of the heading of the heading of the velocity of the supporting vehicle relative to the direction of the desired track over the surface of the earth. This relative heading is converted into an electrical signal by control transmitter 44 which transmits the signal to control transformer 46. The cross-track velocity is integrated by the integrator associated with amplifier 50 to generate signals which are continuously measures of the distance of the supporting vehicle from the track 10 and which may be, for example, fifty or a hundred miles. The summing amplifier 82 and its associated servo, together with control transformer 46 generates a steering signal in accordance with the equation steering signal = $\Psi + k_1 D_{OT} + k_2 V_{CT}$ in which the $k_2 V_{CT}$ acts as a damping factor to cause the supporting vehicle to approach the desired path 10 in an optimum manner to limit overshoot and to damp oscillations.

The limiter of resistors 74 and 76 and Zener diodes 78 and 80 limits the $D_{OT}$ signal so that the angle of approach of the vehicle to the predetermined ground track does not exceed plus or minus 90 degrees.

To test the operation of the equipment, the self-test switches 92, 94 and 96 are moved to their second position where switches 92 and 94 are connected to a pair of adjustable voltage sources 102 and 104 whose amplitude and polarity are predetermined. With the predetermined amplitude and polarity of voltage sources 102 and 104, the signal at the output of control transformer 46 should have a predetermined value. That value is set on potentiometer 110 and is compared to the actual steering signal at the output of control transformer 46. Any significant deviation causes lamp 112 to light indicating that the equipment is not operating properly. It is obvious that the converse could be used, i.e. the lamp could be made to light only when the equipment is operating properly. Further, other meters, and indicating devices could be used in place of lamp 112.

I claim:
1. In combination:
   signal generating means for generating signals which are measures of north velocity and east velocity of a supporting vehicle;
   first resolving and servo means, connected to receive signals from such signal generating means, for converting said signals into signals which are measures of velocity of said supporting vehicle and of the heading azimuth angle of said supporting vehicle;
   means for generating a signal which is a measure of the heading azimuth angle of a desired track of said vehicle over the surface of the earth;
   subtracting means for subtracting said last named signal from said signal representing the heading azimuth angle of said vehicle, to generate a signal which is a measure of the heading angle of said vehicle relative to said desired ground track direction;
   second resolving means, connected to the said first resolving and servo means and to said subtracting means to generate a signal which is a measure of the component of velocity of said vehicle perpendicular to said desired ground track direction;

integrating means, including means for zeroing said integrating means, connected to said second resolving means to generate a signal which is a measure of the displacement of said vehicle from said desired ground track;

summing means, connected to said second resolving means and to said integrating means, and including a limiting means between said integrating means and said summing means; and adding means for adding to said last named summed signal, said signal which is a measure of heading of said vehicle relative to said ground track to generate a steering signal adapted to be used by said vehicle.

2. A device as recited in claim 1 and further comprising indicating means, connected to the output of said integrating means to read the measure of displacement of said vehicle relative to said desired track.

3. A device as recited in claim 1 and further comprising means for inserting first predetermined signals in place of said North and East velocity signals, means for generating a second predetermined signal representative of a predetermined desired value of said steering signal corresponding to said first predetermined signal, and means for comparing said steering signal to said second predetermined signal to determine that the entire said circuit is operating properly.

4. In combination:
means for generating a signal which is a measure of cross-track velocity of a supporting vehicle relative to a predetermined ground track direction;

means for generating a signal which is a measure of the heading of said supporting vehicle relative to the predetermined direction of said ground track;

integrating means, connected to receive said cross-track velocity signal, for integrating said cross-track velocity signal to generate a signal which is a measure of the off-track displacement of said vehicle from said predetermined ground track; and summing means for adding said relative heading signal, a first predetermined factor multiplied by said off-track distance signal, and a second predetermined factor multiplied by said cross-track velocity signal, to generate a steering signal for said supporting vehicle.

5. A device as recited in claim 4 in which means is connected between the output of said integrating means and the input of such summing means to limit the amount of signal transmitted from said integrating means to a predetermined maximum to cause said steering signal to be limited to less than 90 degrees.

6. In combination:
means for generating a north velocity signal which is a measure of the north velocity of a supporting vehicle;

means for generating an east velocity signal which is a measure of the east velocity of a supporting vehicle;

a sine-cosine potentiometer, connected to receive said north velocity and said east velocity signals;

a first summing means for adding the north-velocity-times-the-cosine output signal of said first potentiometer and the east-velocity-times-the-sine output signal of said potentiometer to generate a first summed signal;

a first servo motor, whose shaft is connected to the drive shaft of said first potentiometer;

a first shaft-velocity generator, connected to be driven by said first motor;

a second summing amplifier, connected to receive damping signals from said first generator, connected to receive said first summed signal to control the gain of said second amplifier, and connected to receive from said first potentiometer signals which are a measure of the difference between said north-velocity-times-the-sine output signal and said east-velocity-times-the-cosine output signal of said first potentiometer to cause the shaft of said first motor to have a position which is a measure of the azimuth of the velocity of said supporting vehicle and to cause such first summed signal to be a measure of the velocity of said supporting vehicle;

a third amplifier, connected to the output of said first amplifier for inverting said first summed signal to generate a third summed signal which is a measure of opposite sign of the velocity of said supporting vehicle;

a mechanical differential having first and second input shafts and an output shaft whose position is a measure of the difference between said shaft positions of said first and second input shafts, said first input shaft being connected to the shaft of said first motor and said second input shaft being adapted to be adjusted to a position which corresponds to the azimuth of a predetermined ground track over the surface of the earth to cause said output shaft to be a measure of the bearing angle of the velocity of said supporting vehicle relative to said predetermined track;

a sine potentiometer having its input terminals connected to said first and second summed signals which are each proportional, but opposite in sign, to the velocity of said supporting vehicle, and having its shaft mechanically connected to be positioned by the output shaft of said differential;

a control transmitter, connected to the output shaft of said differential, to generate an electrical signal which is a measure of the bearing angle between the velocity of said supporting vehicle and said predetermined ground track;

an operational integrator, including means for adjusting the output signal of said integrator, connected to the output of said sine potentiometer to generate a signal which is a measure of the off-track distance of said supporting vehicle from said predetermined ground track;

indicating means, connected to the output of said integrator;

a T limiting circuit with resistors in its series arms and a pair of oppositely poled Zener diodes in parallel in its shunt branch;

a second servo motor;

a third potentiometer, including means for exciting said potentiometer, connected to be driven by the shaft of said second motor;

a second shaft-velocity generator, connected to be driven by the shaft of said second motor, to generate a signal which is a measure of the angular velocity of said shaft;

a fifth summing amplifier, connected to receive signals from the output of said sine potentiometer, from said limiting circuit, from said third potentiometer, and from said second generator, and connected to drive said motor;

a control transformer, connected to be excited by said control transmitter and to be driven by the shaft of said second motor, the output signal of said control transformer being a steering signal adapted to control a steering auto-pilot of said vehicle.

7. A device as recited in claim 6 in which the parameters of said limiting circuit are chosen to limit the signal at the output of said control transformer to less than ninety degrees.

8. A device as recited in claim 6 in which said north and east velocity signals are first and second predetermined magnitudes and further comprising means for generating a third predetermined signal which is the calculated value of said steering signal, and means for comparing said third predetermined signal with the output of said control transformer.

9. In a track follower for guiding a vehicle onto a predetermined track over the surface of the earth, means for generating a first signal, $V_{CT}$, which is a measure of the velocity component of said vehicle perpendicular to said track;

means for integrating said $V_{CT}$ signal to generate a second signal $D_{OT}$, including means for adjusting $D_{OT}$, which is a measure of the distance said vehicle is from said track;

means for generating a third signal, $\Psi$, which is a measure of the azimuth of the track of said vehicle relative to the azimuth of said predetermined track;

means for scaling said first and second signals with predetermined constants $k_2$ and $k_1$ respectively;

and means for summing $\Psi + k_1 D_{OT} + k_2 V_{CT}$, in which $k_1$ and $k_2$ are predetermined constants, to generate a steering signal for said vehicle to intercept and follow said predetermined track.

10. A device as recited in claim 9 and further comprising means for limiting said $D_{OT}$ signal to prevent said $\Psi$ signal from exceeding ninety degrees.

References Cited

UNITED STATES PATENTS

| | | | |
|---|---|---|---|
| 2,873,074 | 2/1959 | Harris et al. | 235—150.26 X |
| 3,011,738 | 12/1961 | Skramstad et al. | 235—150.26 X |
| 3,077,557 | 2/1963 | Joline et al. | 235—250.26 X |
| 3,296,422 | 1/1967 | Rusler | 235—150.27 X |

MALCOLM A. MORRISON, *Primary Examiner.*

JOSEPH F. RUGGIERO, *Assistant Examiner.*

U.S. Cl. X.R.

235—150.27